United States Patent
Mosendz et al.

(10) Patent No.: US 8,630,060 B2
(45) Date of Patent: Jan. 14, 2014

(54) THERMALLY ENABLED EXCHANGE COUPLED MEDIA FOR MAGNETIC DATA RECORDING

(75) Inventors: Oleksandr Mosendz, San Jose, CA (US); Hans J. Richter, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/417,032

(22) Filed: Mar. 9, 2012

(65) Prior Publication Data

US 2013/0235491 A1    Sep. 12, 2013

(51) Int. Cl.
*G11B 5/012* (2006.01)

(52) U.S. Cl.
USPC .................................................. 360/97.11

(58) Field of Classification Search
USPC .......... 360/97.11, 99.08, 99.16, 97.22, 97.19, 360/97.12, 98.07, 99.05
See application file for complete search history.

(56) References Cited

U.S. PATENT DOCUMENTS

| | | | |
|---|---|---|---|
| 5,530,609 A * | 6/1996 | Koga et al. ................... 360/131 |
| 6,534,203 B2 * | 3/2003 | Iwasaki et al. ............... 428/827 |
| 6,650,513 B2 * | 11/2003 | Fullerton et al. ........... 360/324.2 |
| 6,826,131 B2 * | 11/2004 | Kawaguchi et al. ....... 428/819.2 |
| 6,881,497 B2 | 4/2005 | Coffey et al. |
| 7,625,643 B2 * | 12/2009 | Umeda et al. ................ 428/828 |
| 7,846,564 B2 | 12/2010 | Li et al. |
| 7,862,912 B2 | 1/2011 | Hellwig et al. |
| 8,263,239 B2 * | 9/2012 | Berger et al. ............. 428/828.1 |
| 8,277,961 B2 * | 10/2012 | Watanabe .................... 428/828 |
| 8,367,229 B2 * | 2/2013 | Sasaki .......................... 428/829 |
| 8,379,345 B2 * | 2/2013 | Mizukami et al. ......... 360/99.08 |
| 8,385,017 B2 * | 2/2013 | Mizukami et al. ......... 360/99.08 |
| 2002/0048226 A1 * | 4/2002 | Kawaguchi et al. ....... 369/13.08 |
| 2007/0020487 A1 | 1/2007 | Lim et al. |
| 2007/0048552 A1 | 3/2007 | Soeya |
| 2007/0292720 A1 | 12/2007 | Suess |
| 2010/0200124 A1 | 8/2010 | Qiu et al. |
| 2010/0214684 A1 | 8/2010 | Gao et al. |
| 2010/0247969 A1 | 9/2010 | Hauet et al. |
| 2011/0235205 A9 | 9/2011 | Lu et al. |
| 2012/0243397 A1 * | 9/2012 | Yamamoto et al. ........ 369/258.1 |
| 2013/0083426 A1 * | 4/2013 | Tamaoka et al. ........... 360/99.08 |

FOREIGN PATENT DOCUMENTS

| | | |
|---|---|---|
| WO | 2011/021652 A1 | 2/2011 |
| WO | 2011/034499 A1 | 3/2011 |

OTHER PUBLICATIONS

Dumas et al., "Graded Anisotropy FePtCu Films," 2011 IEEE, IEEE Transactions on Magnetics, vol. 47, No. 6, Jun. 2011, pp. 1580-1586.
Zha et al., "Continuously graded anisotropy in single (Fe53Pt47) 100-xCux Films," 2010 American Institute of Physics, Applied Physics Letters, vol. 97, pp. 182504/1-182504/3.

(Continued)

*Primary Examiner* — Allen T Cao
(74) *Attorney, Agent, or Firm* — Zilka-Kotab, PC

(57) ABSTRACT

A heat enabled magnetic media having a composite magnetic recording layer structure that includes first and second magnetic layers and an exchange coupling layer sandwiched between the first and second magnetic layers. The exchange coupling layer has a reduced Curie temperature that allows the magnetic layers to become decoupled a lower temperature. This reduced Curie temperature can be achieved the addition of an alloying element such as Ni or Cu into the exchange coupling layer. Therefore, the exchange coupling layer can be constructed of an alloy such as FePtNi FePtCu, and the magnetic layers can be constructed of a material such as FePt.

18 Claims, 3 Drawing Sheets

(56) References Cited

OTHER PUBLICATIONS

Thiele et al., "Magnetic and Structural Properties of FePt-FeRh Exchange Spring Films for Thermally Assisted Magnetic Recording Media," 2004 IEEE, IEEE Transactions on Magnetics, vol. 40, No. 4, Jul. 2004, pp. 2537-2542.

Alexandrakis et al., "Hard/graded exchange spring composite media based on FePt," 2011 American Institute of Physics, Journal of Applied Physics, vol. 109, pp. 07B729/1-07B729/3.

* cited by examiner

THERMALLY ENABLED EXCHANGE COUPLED MEDIA FOR MAGNETIC DATA RECORDING

FIELD OF THE INVENTION

The present invention relates to magnetic data recording and more particularly to a magnetic media having a novel exchange coupling layer for facilitating thermally assisted magnetic switching while also maintaining optimal magnetic properties in a magnetic recording layer of a magnetic medium.

BACKGROUND OF THE INVENTION

A key component of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). When the slider rides on the air bearing, the write and read heads are employed for writing magnetic impressions to and reading magnetic impressions from the rotating disk. The read and write heads are connected to processing circuitry that operates according to a computer program to implement the writing and reading functions.

As the grains size of magnetic recording media is decreased in order to increase the areal density of the magnetic recording system, a threshold known as the superparamagnetic limit is reached for a given material and temperature. The superparamagnetic limit is a physical constraint, beyond which stable data storage is no longer feasible.

Thermal stability of magnetic recording systems can be improved by employing a recording medium formed of a material with a very high magnetic anisotropy. The energy barrier for a uniaxial magnetic grain to switch between two stabilized states is proportional to the product of the magnetic anisotropy of the magnetic material and the volume of the magnetic grains. In order to provide adequate data storage, the product of the magnetic anisotropy and volume should be as large as $60 k_B T$, where $k_B$ is the Boltzman constant and T is the absolute temperature, in order to provide thermally stable data storage. Although it is desirable to use magnetic materials with a high magnetic anisotropy, very few of such hard magnetic materials exist. Furthermore, with currently available magnetic materials, recording heads are not able to provide a sufficient magnetic writing field to write on such materials.

Heat assisted magnetic recording can provide a solution to this problem. In a heat assisted magnetic recording system, the magnetic medium is locally heated to reduce the coercivity of the recording medium so that the applied magnetic writing field can more easily magnetize the magnetic medium during the temporary softening of the recording medium caused by the localized heating. Heat assisted magnetic recording systems allow for the use of small grain media, which is desirable for recording at increased areal densities, with larger magnetic anisotropy at room temperature, assuring sufficient thermal stability.

Thermally assisted recording runs into problems when the available magnetic field energy becomes small with respect to the thermal energy, which leads to a high number of unrecorded grains and thus to poor quality recording. Composite medium designs have been suggested. However, the introduction of a Curie temperature (low Tc) material in conjunction with a Curie temperature (high Tc) material does not solve this problem.

SUMMARY OF THE INVENTION

The present invention provides a magnetic media for data recording that includes a first magnetic layer having a first curie temperature, a second magnetic layer having second a curie temperature, and an exchange coupling layer having a third curie temperature sandwiched between the first and second magnetic layers, wherein the third Curie temperature is lower than the first and second Curie temperatures.

The magnetic media can also be constructed as a lamination of several (e.g. three or more) magnetic layers which are all separated from one another by exchange coupling layers having reduced Curie temperatures.

The invention allows the Curie temperature of the exchange coupling layer to be reduced without adversely affecting the magnetic properties of the magnetic layers. In this way, the magnetic layers can be more easily decoupled when heated during a writing event, but can maintain strong magnetic coercivity and anisotropy for stable bit recording.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
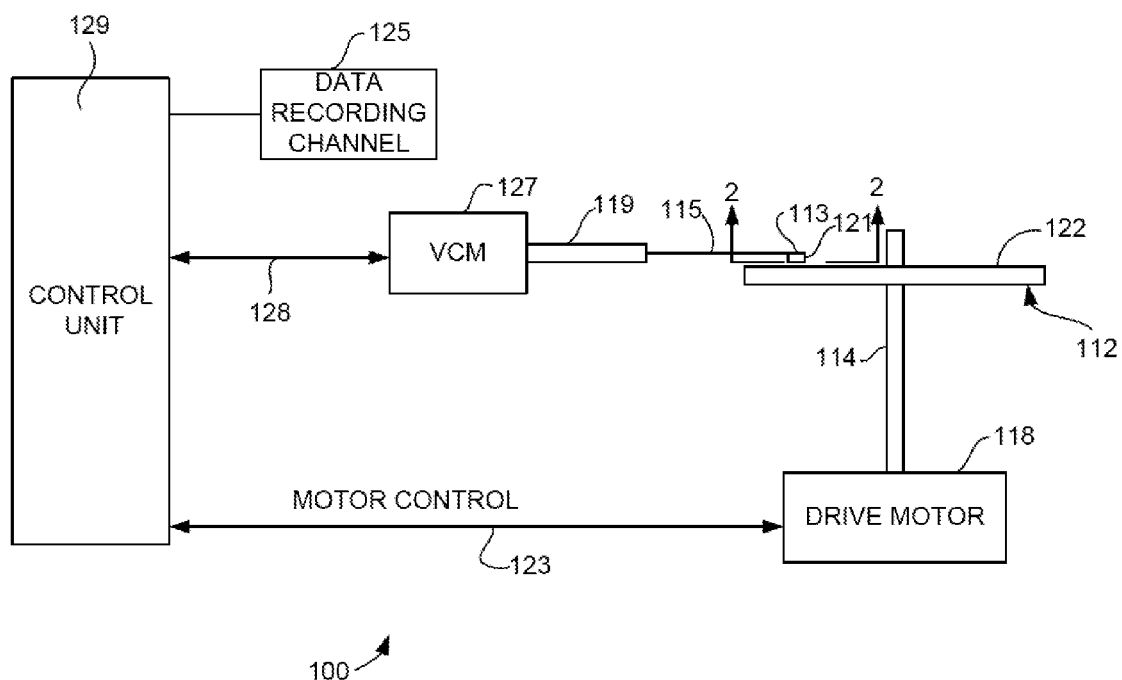
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
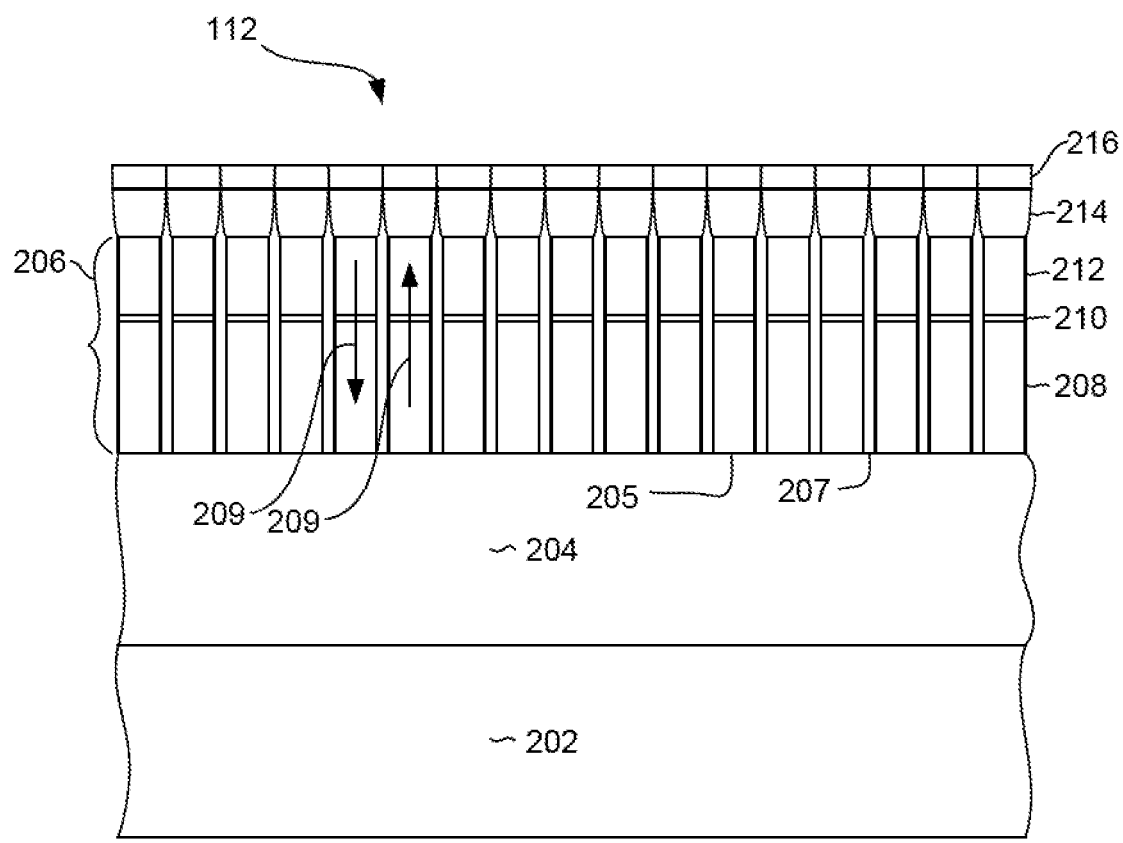
FIG. 2 is an enlarged, cross sectional view of a portion of a magnetic media according to an embodiment of the invention.

FIG. 2 is an enlarged, cross-sectional view of a portion of a magnetic disk according to an embodiment of the invention. The magnetic disk 112 includes a substrate 202, a soft magnetic under-layer 204 and an exchange coupled composited recording layer structure 206 formed over the soft magnetic layer 204. A hard, non-magnetic protective layer such as diamond-like carbon (DLC) or some other suitable material 214 can be provided above the exchange coupled recording layer structure 206. In addition, a thin layer of lubricant 216 can be provided above the hard, non-magnetic protective layer 214.

The composite recording layer structure 206 includes a first magnetic layer 208, a second magnetic layer 212 and an exchange coupling layer 210 sandwiched between the first and second magnetic layers 208, 212. The structure 206 forms an exchange spring structure that can readily record a magnetic bit when heated and which remains magnetically stable at room temperature.

The composite recording layer structure 206 is formed as a plurality of grains 205 that are preferably separated from one another by non-magnetic boundaries 207 which can be an oxide or some other material. The grains 205 are preferably long in the direction perpendicular to the surface of the media (e.g. in a vertical direction in FIG. 2), and narrow in a direction parallel with the surface of the media 112 (e.g. in a horizontal direction in FIG. 2). This grain shape provides a shape induced magnetic anisotropy that helps to maintain the magnetic stability of recorded grains. When a magnetic bit is recorded to the magnetic recording grain 205, the magnetization of the magnetic layers 208, 212 for that grain 205 are aligned in the same direction either up or down as indicated by arrows 209 in FIG. 2.

The first magnetic layer 208 has a higher magnetic coercivity than the second magnetic layer 212. The exchange coupling layer 210 is a material that exchange couples the two magnetic layers 208, 212 together when the layers 208, 210, 212 are at room temperature. However when the exchange coupling layer 210 is raised to a temperature near its Curie temperature Tc, the exchange field decreases. The exchange coupling layer 210 is constructed of a material that has a lower Curie temperature Tc than either of the layers 208, 212. This means that as the temperature is increased, this layer 210 is the first layer of the three layers 208, 210, 212 to show a reduced exchange strength. The reduction of exchange strength of the exchange coupling layer occurs with little to no change in the magnetic properties of the other layers 208, 212.

This reduction of exchange strength allows the magnetizations to be switched more easily, especially in response to an inhomogenous magnetic field such as from a magnetic write head (not shown in FIG. 2), because the magnetizations of the magnetically decoupled layers 208, 212 can move independently rather than having to be switched together in unison. One can envision this process as an additional stress on the spin chain which the magnetic write head produces at writing. This additional write assist is maximized if the exchange coupling between the layers is reduced to an optimum level. Once the grain has switched in response to the magnetic field from the write head, the media 112 cools and the exchange coupling from the exchange coupling layer 210 resumes, locking the magnetization of the layers in the desired direction to form a stable magnetic bit on the magnetic media.

To this end, the exchange coupling layer 210 can have a Curie temperature (Tc) that is greater than ambient temperature and that is preferably 40-60 degrees Kelvin or about 50 degrees Kelvin greater than ambient temperature. Also, as mentioned above, the Curie temperature (Tc) of the exchange coupling layer 310 is lower than that of either of the magnetic layers 208, 212. More preferably the Curie temperature (Tc) of the exchange coupling layer 210 is 40-60 degrees Kelvin or about 50 degrees Kelvin lower than the Curie temperature (Tc) of either of the magnetic layers 208, 212 of the structure 206.

For the two magnetic layers 208, 212, the first magnetic layer has Ms1, HA1, and the second magnetic layer has Ms2, HA2, where Ms is the saturation magnetization and HA is the magnetic anisotropy field. As discussed above, the two layers 208, 212 are exchange coupled with an exchange coupling energy X. In principle, all properties are temperature dependent (e.g. Ms, HA, and X). For very strong exchange coupling, the switching field of the structure 206 is given by: Hsw(inifinity)=[Ms1HA1d1+MsHA2d2]/[Ms1d1+Ms2d2].

For the sake of argument one can consider a case where only the exchange coupling X(T) is temperature dependent. Then, the switching field is reduced at elevated temperature, without a reduction in magnetization of the layers 208, 212, which would be optimal. However, in practical terms, there will be some temperature dependence of the magnetic properties of the layers 208, 212. It is desirable, however, to minimize this temperature dependence of the magnetic properties of the layers 208, 212. This can be accomplished by selecting materials with high Curie temperature Tc for the magnetic layers 208, 212, with a lower Curie temperature Tc for the exchange coupling layer 210. The temperature dependence of the magnetization is generally rather weak for a temperature less than about 90 percent of the Curie temperature Tc. Therefore, keeping the Tc of the exchange coupling layer 210 lower than that of the magnetic layers 208, 212 will accomplish this. The exchange coupling field (J(T)) depends roughly on the temperature as $Ms(T)^2$.

The material of choice for use in magnetic layers 208, 212 is ordered L10 FePt due to its high magnetic anisotropy and moderately high Curie temperature Tc. Adding Ni to FePt reduces Tc. A reduction of Tc is advantageous for thermally assisted recording, but the Ni addition also causes the anisotropy to decrease such that there—would be no net advantage. For the exchange coupling layer 210, the Ni addition is well suited, because the total thickness of the exchange coupling layer is very small, (less than 1 nm) and therefore the loss in magnetic anisotropy does not matter much.

To this end, in one embodiment of the invention, the first magnetic layer 208 can be constructed of a FePt alloy having a highly ordered crystalline structure and having a thickness about 2-5 nm, and the second magnetic layer 212 can be constructed of a FePt alloy having a low to moderate ordered crystalline structure and having a thickness of 3-10 nm. The lower ordering of the crystalline structure of the second magnetic layer 212 results in the second magnetic layer 212 having a lower magnetic coercivity than that of the first magnetic layer 208. The exchange coupling layer 210 can be formed of FePtNi and can have a thickness of 1 nm or less. Generally, a smaller thickness for the exchange coupling layer 210 is preferred down to a thickness of a single atomic layer (i.e. 0.2 mn). The concentration of Ni in the exchange coupling layer 210 can be 30% to 50% atomic percent.

The composition of the exchange coupling layer 210, its thickness and the individual thickness of the magnetic layers 208, 212 can be optimized. It may be useful to add Cu to the magnetic layers 208 to lower the Curie temperature of this layer. Cu addition has been shown to lower the Curie temperature with only a moderate loss of magnetic anisotropy. Up to about 20 atomic percent. Cu can be used in the FePt first magnetic layer 208 to lower the Curie temperature. Both layers 208, 212 could include some amount of Cu, but preferably one of the layers 208, 212 would have more Cu than the other, with the preference of achieving a monotonic Cu profile.

In an alternate embodiment, Cu can be used to control the Curie temperature of the exchange coupling layer 210, rather than the previously described Ni. In that case, the exchange coupling layer can be constructed of a FePtCu alloy. A lower Curie point for the exchange coupling layer 210 can be achieved by increasing the concentration of Cu to up to 50 atomic percent, with a smaller reduction in magnetic anisotropy than would be possible when using Ni to control Tc in the exchange coupling layer 210.

Figure 3:
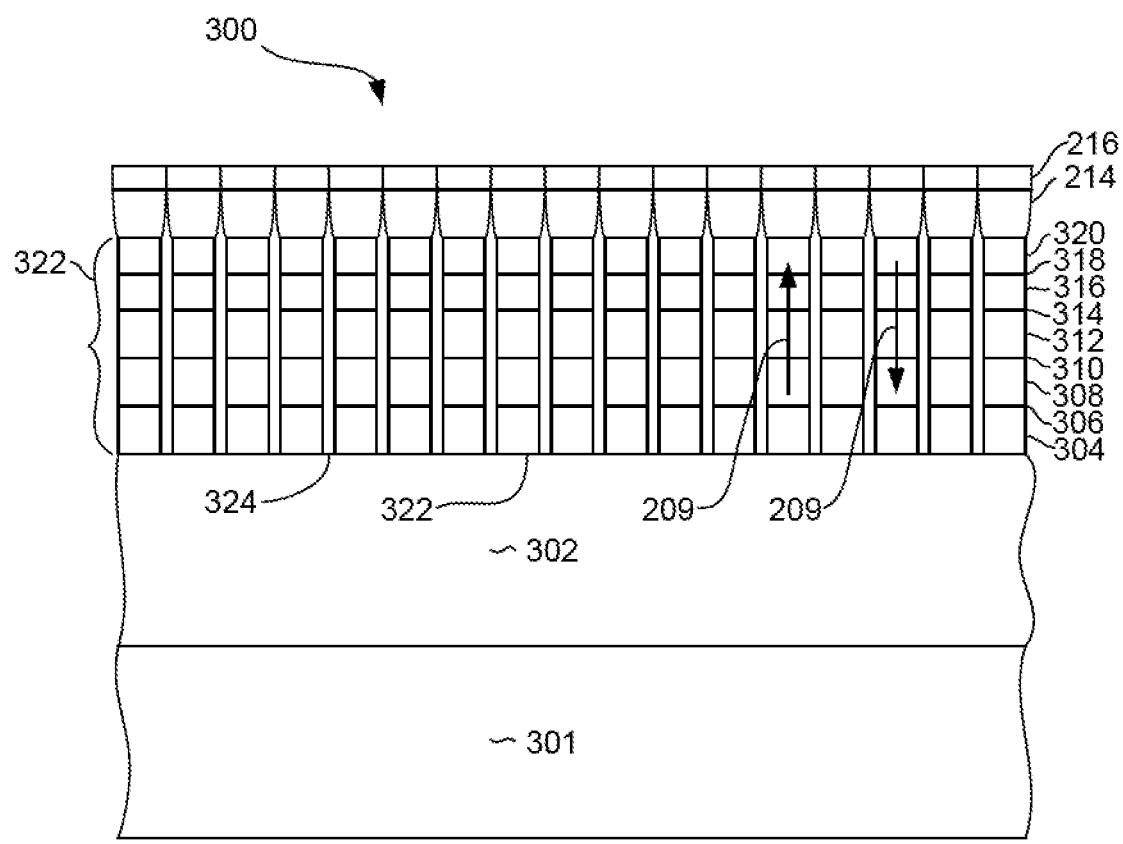
FIG. 3 is an enlarged cross sectional view of a portion of a magnetic media according to an alternate embodiment of the invention.

With reference now to FIG. 3, another possible embodiment of the invention includes a magnetic disk 300 having a multi-layer recording layer structure 322 that includes a plurality (e.g. more than two) recording magnetic layers 304, 308, 312, 316, 320 all of which are separated by thin exchange coupling layers 306, 310, 314, 318. The multi-layer recording layer structure 322 can be formed over a soft magnetic layer 302 both of which can be formed on a substrate 301. Although 5 such magnetic layers 304, 308, 312, 316, 320 are shown in FIG. 3, this is by way of example, as some other number of magnetic layers could be used, such as for example, 3, 4, 6 layers, etc. Also, in FIG. 3, each of the exchange layers 306, 310, 314, 318 is represented as a single line between each of the magnetic layers 304, 308, 312, 316, 320. The layers 304-320 are formed as individual, vertically grown crystals 322 separated by non-magnetic boundaries 324, similar to the crystals 205 and non-magnetic boundaries 207 of FIG. 2.

In the specific example shown in FIG. 3, each of the magnetic layers 304, 308, 312, 316, 320 can be constructed of FePt, and can each have different thicknesses, which can range, for example from 1-4 nm. The exchange coupling layers 306, 310, 314, 318 can be constructed of FePtNi with increasing concentrations of Ni and can have each have a thickness up to 1-4 nm. More specifically, the first exchange coupling layer 306 can have a Ni concentration of about 12 atomic percent. The second exchange coupling layer 310 can have a Ni concentration of about 23 atomic percent. The third exchange coupling layer 314 can have a thickness of about 34 atomic percent, and the fourth exchange coupling layer 318 can have a thickness of about 45 atomic percent. As with the previously described embodiment, Cu can be added rather than Ni, however in that case, the amount of Cu added would be different from the amount of Ni added.

For thermally assisted magnetic recording media, the temperature dependence of the exchange coupling layers represents an additional set of parameters. The grading of the FePt layers can be accomplished by different degrees of chemical ordering or different compositions. Here also, reverse grading (highest anisotropy on top closest to the head) could be advantageous. In that case, the order of layers shown in FIG. 3 would be reversed so as to have a decreasing Ni content in the exchange coupling layers 306, 310, 314, 318 as the layers move up toward the surface of the media 300. Additional media properties (decoupling of the grains in lateral direction for example) and the general growth behavior can follow state of the art structures. Since a low Curie temperature of the recording layer is no longer needed, even a Co-based material can be used in the magnetic layers 208, 212 of the structure 206 (FIG. 2) or in the magnetic layers 304, 308, 312, 316, 320 of structure 322 (FIG. 3). In this case, a Cr rich exchange coupling layer 210 (FIG. 2) or 306, 310, 314, 318 (FIG. 3) could be used to lower the Curie temperature.

Each of the exchange coupling layers 306, 310, 314, 318 has a Curie temperature (Tc) that is greater than ambient temperature, and that is more preferably 40-60 degrees Kelvin (or more preferably about 50 degrees Kelvin) greater than ambient temperature. Also, each of the exchange coupling layers 306, 308, 310, 314, 318 has a Curie temperature (Tc) that is lower than that of any of the magnetic layers 304, 308, 312, 316, 320. Preferably, each of the exchange coupling layers 306, 310, 314, 318 has a Curie temperature (Tc) that is 40-60 degrees Kelvin (or more preferably about 50 degrees Kelvin) lower than that of any of the magnetic layers 304, 308, 312, 316, 320.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic media for data recording, comprising:
 a first magnetic layer having a first curie temperature;
 a second magnetic layer hay hag* a second curie temperature; and
 an exchange coupling layer having a third curie temperature between the first and second magnetic layers, wherein the third curie temperature is lower than the either of the first and second Curie temperatures;
 wherein the first magnetic layer comprises a FePt alloy having a highly ordered crystalline structure, the second magnetic alloy comprises a FePt alloy having a lo o moderately ordered crystalline structure and the exchange coupling layer comprises an alloy that includes Fe, Pt and Ni.

2. The magnetic media as in claim 1 wherein the exchange coupling layer comprises an alloy that includes Ni.

3. The magnetic media as in claim 1 wherein the exchange coupling layer comprises a FePtNi alloy.

4. The magnetic media as in claim 1 wherein each of the first and second magnetic layers comprise a FePt alloy and the exchange coupling layer comprises a FePtNi alloy.

5. The magnetic media as in claim 1 wherein the first magnetic layer has a thickness of 2-5 nm, the second magnetic layer has a thickness of 3-10 nm and the exchange coupling layer has a thickness that is not greater that 1 nm.

6. The magnetic media as in claim 1 wherein the exchange coupling layer comprises a FePtNi alloy having a Ni concentration of 30 to 50 atomic percent.

7. The magnetic media as in claim 1 wherein the first magnetic layer comprises an alloy that includes Cu.

8. The magnetic media as in claim 1 wherein the first magnetic layer comprises an alloy that includes Fe, Pt and Cu.

9. The magnetic media as in claim 1 wherein the exchange coupling layer comprises an alloy that includes Fe, Pt and Cu.

10. The magnetic media as in claim 1 wherein each of the first and second magnetic layers comprises FePt and the exchange coupling layer comprises FePtCu.

11. The magnetic media as in claim 1 wherein the first Curie temperature is 40-60 degrees Kelvin higher than an ambient temperature.

12. The magnetic media as in claim 1 wherein the third Curie temperature is 40-60 degrees Kelvin lower than either of the first and second Curie temperatures.

13. The magnetic media as in claim 1 wherein the exchange coupling layer comprises an alloy that includes Cr.

14. A magnetic media for data recording, comprising:
a first magnetic layer having a first curie temperature;
a second magnetic layer having a second curie temperature; and
an exchange coupling layer having a third curie temperature between the first and second magnetic layers, wherein the third curie temperature is lower than
wherein the third Curie temperature is 40-60 degrees Kelvin above an ambient temperature and the and the third Curie temperature is 40-60 degrees lower than either of the first and second Curie temperatures.

15. A magnetic data recording system comprising:
a housing;
a magnetic media mounted within the housing;
a slider held within the housing and arranged for movement adjacent to a surface of the magnetic medium, the slider having mounted thereon, a write head, a read head and a heating element for locally heating the magnetic media;
wherein the magnetic media further comprises:
a first magnetic layer having a first curie temperature;
a second magnetic layer having a second curie temperature; and
an exchange coupling layer having a third curie temperature sandwiched between the first and second magnetic layers, wherein the third curie temperature is lower than the either of the first and second Curie temperatures;
wherein the first magnetic layer comprises a FePt alloy having a highly ordered crystalline structure, the second magnetic alloy comprises a FePt alloy having a low to moderately ordered crystalline structure and the exchange coupling layer comprises an alloy that includes Fe, Pt and Ni.

16. The magnetic data recording system as in claim 15 wherein the exchange coupling layer comprises an alloy that includes Ni.

17. The magnetic data recording system as in claim 15 wherein the exchange coupling layer comprises a FePtNi alloy.

18. The magnetic data recording system as in claim 15 wherein each of the first and second magnetic layers comprise a FePt alloy and the exchange coupling layer comprises a FePtNi alloy.

* * * * *

UNITED STATES PATENT AND TRADEMARK OFFICE
CERTIFICATE OF CORRECTION

PATENT NO. : 8,630,060 B2  Page 1 of 1
APPLICATION NO. : 13/417032
DATED : January 14, 2014
INVENTOR(S) : Mosendz et al.

It is certified that error appears in the above-identified patent and that said Letters Patent is hereby corrected as shown below:

In the Claims:

Claim 1, col. 6, line 49, replace "hay hag*" with --having--;

Claim 1, col. 6, line 56, replace "lo o" with --low to--;

Claim 5, col. 7, line 4, replace "that 1 nm" with --than 1 nm--;

Claim 14, col. 7, after line 31, please insert --either of the first and second Curie temperatures;--.

Signed and Sealed this
Fifteenth Day of April, 2014

Michelle K. Lee
*Deputy Director of the United States Patent and Trademark Office*